United States Patent [19]

Brogdon et al.

[11] 4,293,276
[45] Oct. 6, 1981

[54] LAMINATED COMPOSITE ROTOR YOKE

[75] Inventors: Vas H. Brogdon, Hurst; David L. Williams, Smithfield, both of Tex.

[73] Assignee: Textron Inc., Providence, R.I.

[21] Appl. No.: 955,332

[22] Filed: Oct. 27, 1978

[51] Int. Cl.³ .............................................. B64C 27/36
[52] U.S. Cl. ................. 416/134 A; 416/141; 416/230
[58] Field of Search ................ 416/230 A, 134 A, 141

[56] References Cited

U.S. PATENT DOCUMENTS

| | | | |
|---|---|---|---|
| 2,830,669 | 4/1958 | Klockner | 416/102 |
| 3,228,481 | 1/1966 | Eldred | 416/134 A |
| 3,384,185 | 5/1968 | Fernandez | 416/244 |
| 3,669,566 | 6/1972 | Bourquardez | 416/134 A |
| 3,807,896 | 4/1974 | Johnson | 416/102 |
| 3,874,815 | 4/1975 | Baskin | 416/134 A |
| 3,880,551 | 4/1975 | Kisovec | 416/134 A |
| 3,967,918 | 7/1976 | Mouille et al. | 416/141 |
| 4,008,980 | 2/1977 | Noehren et al. | 416/134 A |
| 4,038,885 | 8/1977 | Jonda | 74/581 |
| 4,047,839 | 9/1977 | Ferris et al. | 416/134 A |
| 4,227,857 | 10/1980 | Reyes | 416/134 A |

Primary Examiner—Everette A. Powell, Jr.
Attorney, Agent, or Firm—Richards, Harris & Medlock

[57] ABSTRACT

A rotor yoke (10) for coupling helicopter blades to a rotatable support mast (12) utilizes a novel laminated construction. Layers (30) of unidirectional fibers and layers (32) of bias ply fibers are arranged in alternating sequence to form an elongate loop structure. At least some of the bias ply layers (32) extend between the sides of the loop to form a transverse central section (20). Further, at least some of the bias ply layers (32) include gaps to provide flexure areas (24) in the sides of the yoke (10).

12 Claims, 7 Drawing Figures

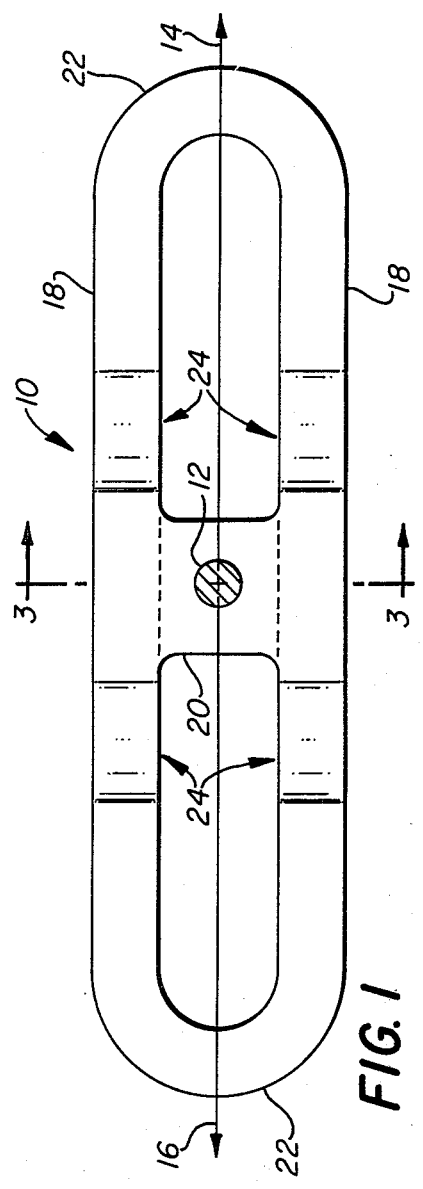
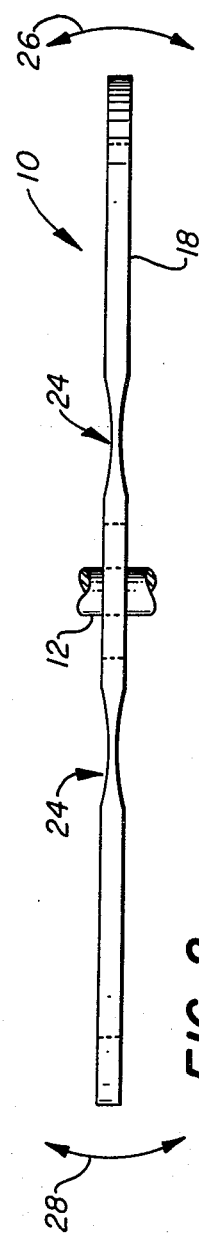
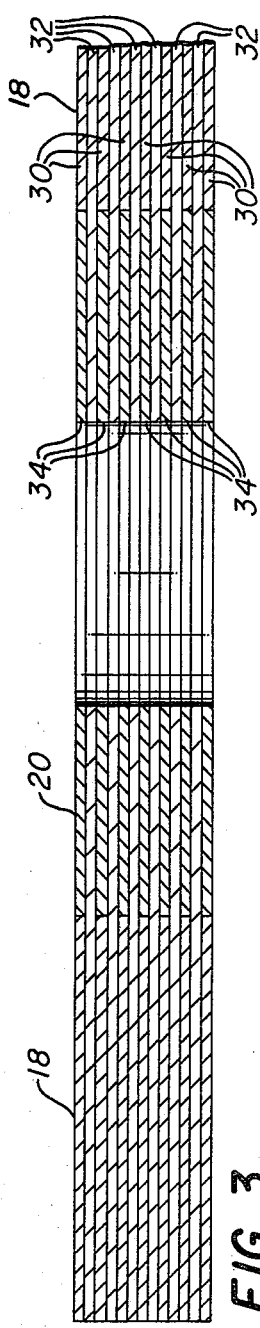
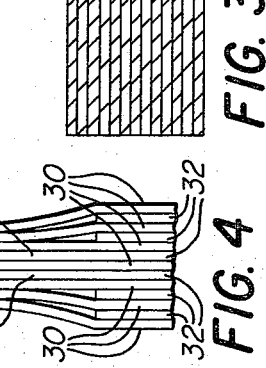

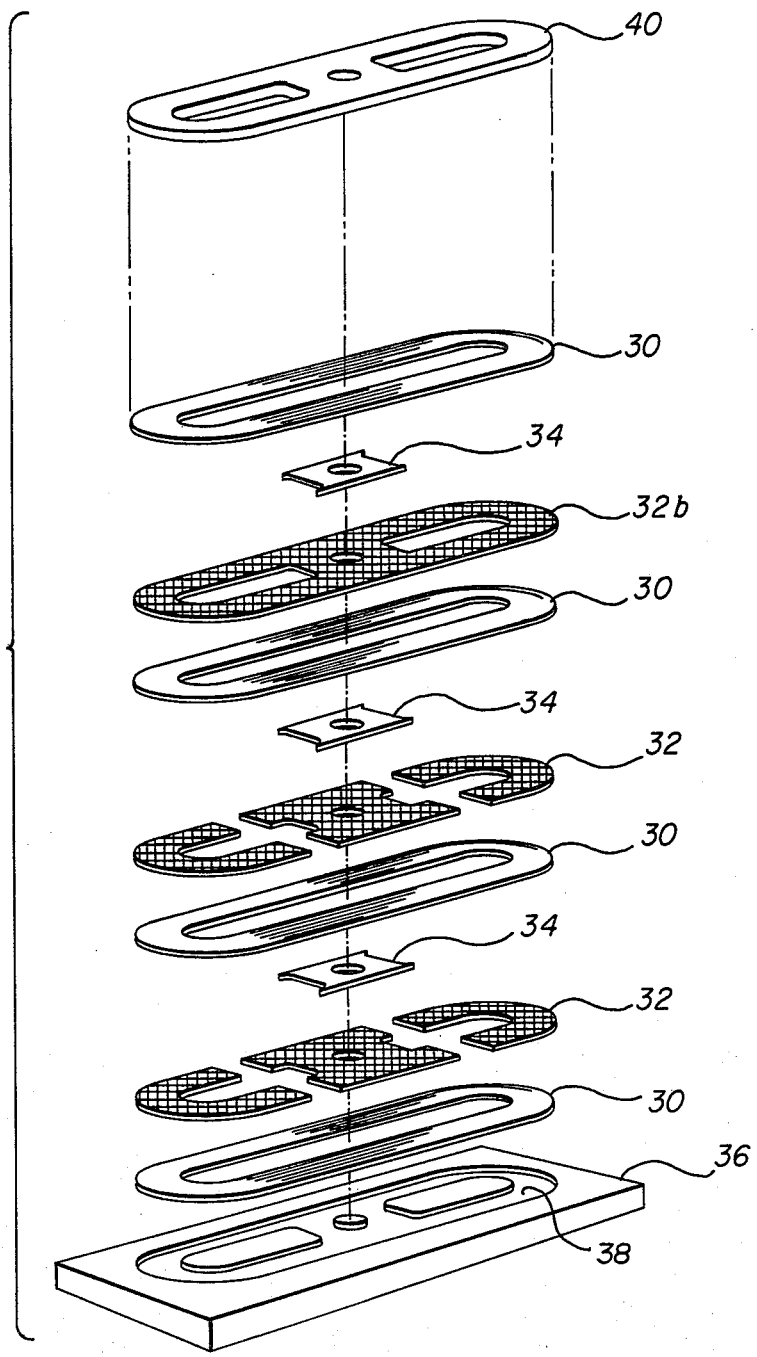

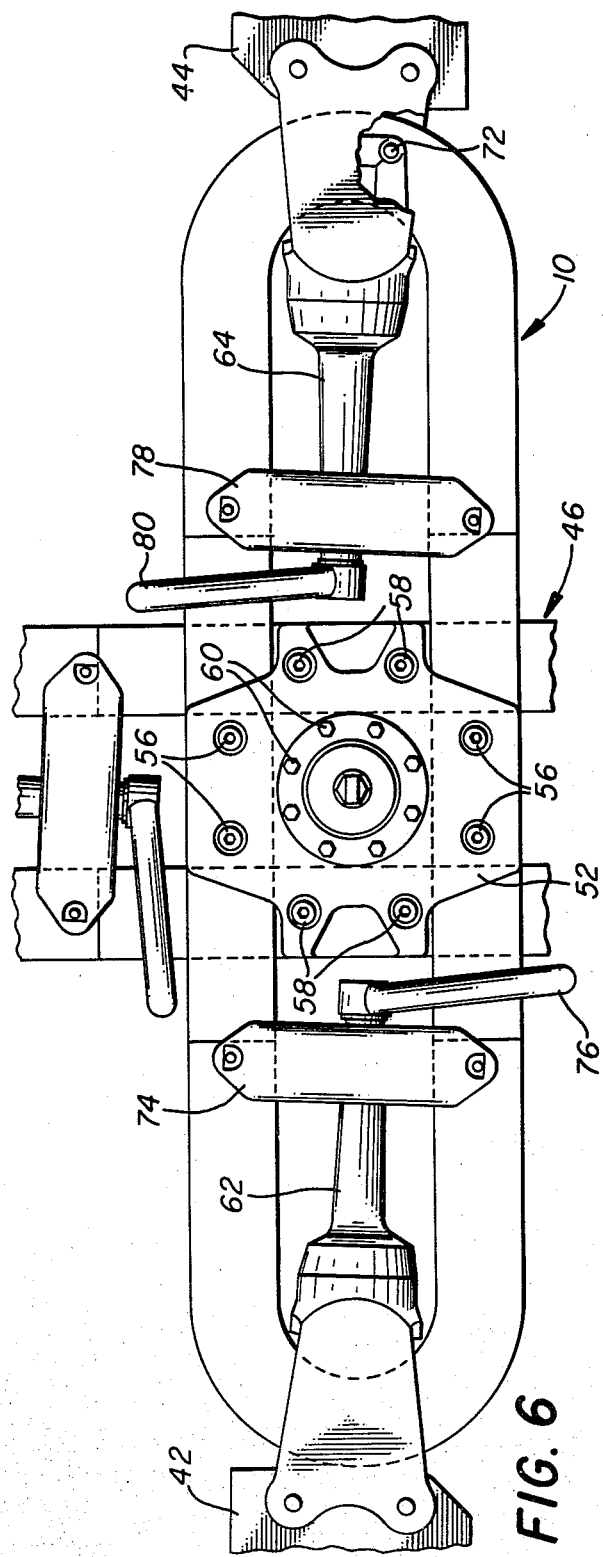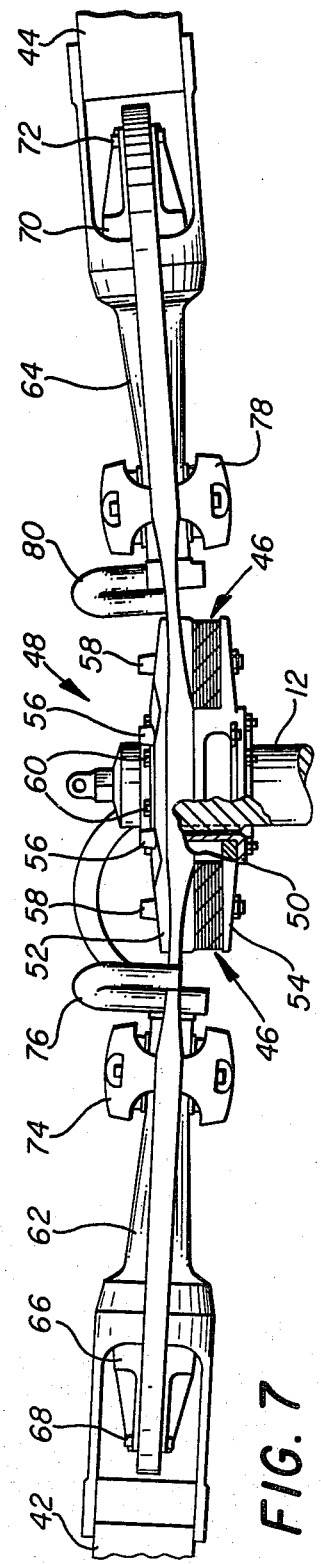
FIG. 6
FIG. 7

LAMINATED COMPOSITE ROTOR YOKE

TECHNICAL FIELD

The present invention relates generally to a yoke for coupling helicopter blades to a mast. More particularly, this invention concerns a laminated rotor yoke of composite, reinforced construction to withstand the forces transferred between the mast and the helicopter blades.

BACKGROUND ART

Each blade of the main rotor assembly of a helicopter must be connected to the main support mast (usually by means of a rotor yoke) in a manner allowing several degrees of freedom. Such an interconnection is subjected to high and repeated stresses of both torsional and centrifugal natures, and is therefore an extremely important component of the aircraft. Each blade must be able to rotate about its longitudinal axis to provide pitch control. Each blade must be able to flap in a direction perpendicular to the rotor plane to withstand vertical loads. In some instances, each blade must be able to pivot within the rotor plane to provide for lead-lag control. The manner in which the blades are secured to the main support mast enables a helicopter to be controlled and maneuvered in flight.

Various structures and mechanisms have been utilized to interconnect the helicopter blades and the support mast. The prior art includes several examples of articulated metal couplings. Such couplings have suffered from the disadvantages of weight, cost, high maintenance requirements, and low useful life. There have been several attempts to eliminate one or more of the articulations in such couplings in order to simplify construction and reduce costs. Some rotor hubs or yokes are pivotally secured to the support mast, and are characterized by a flat plate construction resilient enough to act as a virtual hinge and thereby accomodate flapping of the blades. Two examples of these devices can be found in U.S. Pat. Nos. 3,804,552 and 3,652,185.

More recently, glass fibers and other composite materials have been employed in the fabrication of helicopter rotor system components. For example, a rotor yoke has been constructed by forming a loop from wound filaments with layers of cross plies normal to the central plane of the loop arranged only in the sides thereof. In comparison to a machined metal forging, glass fibers and other composite materials have more favorable fatigue characteristics resulting in longer useful life. In addition, the use of such materials simplifies construction and reduces costs. One of the problems encountered in utilizing such materials in helicopter rotor yokes, however, has been in the attachment of the yoke to the support mast. In order to provide the necessary bearing strength, clamping hardware was required and it was necessary to design the rotor yoke with special attachments for the hub of the support mast, as well as the damper fitting and outboard bearing of the rotor system. There is thus a need for a composite rotor yoke of simplified construction which will withstand the necessary bearing forces for direct bolted attachment and which does not require adaptive hardware.

DISCLOSURE OF INVENTION

The present invention comprises a composite rotor yoke which overcomes the foregoing and the other problems associated with the prior art. The rotor yoke of the present invention features improved fatigue life, simplified construction, and lower cost. In accordance with the broader aspects of the invention, there is provided a novel laminated composite rotor yoke which can be attached directly to other components of the helicopter rotor system without additional clamping hardware. The composite rotor yoke of the present invention is more easily fabricated with a desired rotor precone configuration, so that the helicopter blades are supported at the desired dihedral angle during zero and low rates of rotation.

In accordance with the present invention, a laminated composite rotor yoke comprises an elongate loop of layered construction. Each layer consists of glass fibers arranged in predetermined orientations. The glass fibers comprising each layer are arranged in mutually parallel fashion to faciliate construction of the rotor yoke. The yoke is built by stacking layers of unidirectional fibers and layers of reinforcing cross ply fibers in alternating sequence. In an area between the longitudinal sides of the loop, filler layers are provided between the layers of cross ply fibers. Areas of reduced cross section are formed in the longitudinal side portions of the loop to provide the desired flexural characteristics. The rotor yoke of the present invention exhibits improved in-plane shear strength and can be directly bolted to the support mast structure.

BRIEF DESCRIPTION OF DRAWINGS

A more complete understanding of the invention can be had by reference to the following Detailed Description in conjunction with the accompanying Drawings, wherein:

FIG. 1 is a top view of a rotor yoke incorporating the present invention, shown in relation to the helicopter support mast;

FIG. 2 is a side view of the yoke shown in FIG. 1;

FIG. 3 is an enlarged cross-sectional view (partially cut away) taken along lines 3—3 of FIG. 1 in the direction of the arrows;

FIG. 4 is an enlarged side view of a portion of the yoke shown in FIG. 2;

FIG. 5 is an exploded view illustrating the method of fabricating the rotor yoke of the present invention;

FIG. 6 is a top view (partially cut away) of an installation including a rotor yoke of the present invention; and FIG. 7 is a side view (partially cut away) of the installation of FIG. 6.

DETAILED DESCRIPTION

Referring now to the Drawings wherein like reference numerals designate like or corresponding parts throughout the several views, and particularly referring to FIG. 1, there is shown a rotor yoke 10 incorporating the invention. The rotor yoke 10 is employed to interconnect a support mast 12 and a pair of helicopter blades extending in the directions of arrows 14 and 16. The general configuration of rotor yoke 10 is that of an elongate loop. The rotor yoke 10 includes a pair of spaced apart longitudinal side portions 18 interconnected by a transverse central portion 20. The ends of longitudinal side portions 18 are interconnected by rounded outboard portions 22. The helicopter support mast 12 is received through a hole formed in the central portion 20 so that the axis of mast 12 coincides with the center of rotor yoke 10. As will be more fully explained hereinafter, the rotor yoke 10 is characterized by laminated, composite construction which permits direct bolted attachment without special clamps or other adaptive hardware.

Referring now to FIG. 2 in conjunction with FIG. 1, each longitudinal side portion 18 of rotor yoke 10 includes two flexure areas 24. The flexure areas 24 comprise reduced cross sections and are located outboard of the central portion 20. Provision of the flexure areas 24 permits the helicopter blades to flap in the directions of arrows 26 and 28. As will be clearly explained, the amount of reduction in areas 24 is tailored to the specific flexural requirements of the rotor assembly.

Referring to FIG. 3, there is shown the internal construction of the rotor yoke 10. For clarity, mast 12 has been omitted from FIG. 3. The rotor yoke 10 is of laminated, composite construction featuring glass fiber materials. Those skilled in the art will appreciate that any one of several types of suitable, commercially available filament materials can be used. Glass fibers embedded in adhesive, such as epoxy, or pre-impregnated glass rovings have been found satisfactory.

The rotor yoke 10 includes a plurality of loop layers 30 and reinforcing layers 32 arranged in mutually parallel relationship. The exact number of layers 30 and 32 depends upon the particular design requirements. The layers 30 and 32 are stacked in alternating sequence. The loop layers 30 comprise unidirectional fiber rovings that course around the loop defining the rotor yoke 10. The rovings that comprise each loop layer 30 are arranged in flat, side by side relationship and thus extend in a longitudinal direction within side portions 18. It should be noted that a part of right side portion 18 has been cut away. The reinforcing layers 32 are comprised of fibers arranged in biased relationship with the fibers comprising the loop layers 30. Preferably, each reinforcing layer 32 is comprised of $\pm 45°$ cross-plies of fibers. It will be appreciated that reinforcing layers 32 extend completely across the rotor yoke 10 to define the central portion 20 thereof.

Since there are no loop layers 30 in the central portion 20 of rotor yoke 10, filler layers 34 are provided. The filler layers 34 are of substantially the same thickness as loop layers 30, and extend between side portions 18 and only within the central portion 20 of yoke 10. The filler layers 34 keep the fibers of reinforcing layers 32 in substantially planar condition within the central portion 20. Any suitable material can be utilized for filler layers 34. Preferably, the filler layers 34 comprise additional cross-plies of fibers. All the reinforcing layers 32 extend continuously within portions 18 and 22 of the rotor yoke 10 except in the vicinity of flexure areas 24. It will thus be understood that the rotor yoke 10 comprises a laminated structure formed of a plurality of layers, each of which includes fibers arranged in predetermined orientations.

FIG. 4 shows an enlargement of the rotor yoke 10 in one of the flexure areas 24. In forming the flexure areas 24, some of the reinforcing layers 32 are not continuous within the side portions 18. Each unidirectional loop layer 30 extends continuously within the side portions 18. For purposes of illustration, only the middle two reinforcing layers 32a and 32b extend continuously within the side portions 18. Sections of the remainder of the reinforcing layers 32 are omitted in the flexure areas 24 thereby reducing the cross section. Preferably, at least one reinforcing layer 32 is continued through each flexure area 24. It will be understood, however, that the number of reinforcing layers 32 carried through the flexure areas 24 depends upon the flexural requirements of the rotor yoke 10.

FIG. 5 illustrates the method of fabricating the composite rotor yoke 10 of the present invention. In order to construct the rotor yoke 10, a suitable bonding tool 36 is first provided. The bonding tool 36 includes a recessed portion 38 for receiving the various layers comprising the rotor yoke 10. A first unidirectional loop layer 30, of a construction hereinbefore described, is then positioned in the bonding tool 36. A first reinforcing layer 32, of a construction hereinbefore described, is then positioned over the previously positioned loop layer 30. A middle filler layer 34 and another unidirectional loop layer 30 are then placed over the previously positioned reinforcing layer 32.

Any suitable number of layers 30, 32 and 34 can be built up in this manner. For example, one embodiment of the invention employs seven loop layers 30 and six reinforcing layers 32. Following the desired buildup, the layers 30, 32 and 34 are compressed between the bonding tool 36 and a pressure plate 40. The various layers comprising the rotor yoke 10 are thus cured to form a laminated composite structure. In one test unit, the rotor yoke 10 was cured at approximately 250° F. for about one hour under approximately 50–100 psi.

Although the layers 32 and 34 are illustrated with preformed openings for receiving mast 12, it will be appreciated that the mast opening can be formed after curation of the yoke 10.

Since all layers comprising the rotor yoke 10 are parallel, the assembly process is thus reduced to primarily a stacking operation. This type of assembly requires less time and skill, which results in labor savings. In addition, the mutual parallelism of the layers 30, 32 and 34 facilitates the formation of a precone, which refers to the present dihedral angle in the rotor yoke 10. Moreover, this particular construction results in a rotor yoke of superior in-plane shear strength which can be bolted directed to the helicopter mast structure without clamps or other adaptive hardware.

Referring now to FIGS. 6 and 7, there is shown an assembly incorporating the rotor yoke 10. The rotor yoke 10 couples a pair of helicopter blades 42 and 44 to the helicopter support mast 12. Another rotor yoke 46, of construction similar to the present invention, couples another pair of blades (not shown) to the mast 12. While the particular installation depicted includes four blades, it will be understood that the present invention is equally suited for any multi-bladed helicopter.

Both of the rotor yokes 10 and 46 are secured within a hub assembly 48 attached to the mast 12. The hub assembly 48 includes a splined mast adapter 50 and plates 52 and 54 mounted for rotation with the mast 12. The rotor yokes 10 and 46 are secured between upper and lower hub plates 52 and 54. Bolts 56 pass through holes formed in the longitudinal side portions of yoke 10 to secure the yoke between plates 52 and 54. Bolts 58 extend between plates 52 and 54 and holes formed in the longitudinal side portions of rotor yoke 46 to secure the yoke therebetween. Bolts 60 pass through holes formed in the transverse central portions of both rotor yokes 10 and 46 in surrounding relationship with the mast 12.

Blades 42 and 44 are connected to the rotor yoke 10 by means of blade spindles 62 and 64, respectively. The outboard portion of spindle 62 is connected to one outboard portion of the rotor yoke 10 by means of spherical bearing 66 and through bolts 68. The outboard portion of spindle 64 is connected to the other outboard end of the rotor yoke 10 by means of spherical bearing 70 and through bolts 72. The spherical bearings 66 and 70 permit lead-lag control of the blades 42 and 44. The inboard end of spindle 62 extends through an inboard spherical bearing within damper fitting 74, and is attached to a pitch horn 76. Similarly, the inboard end of spindle 64 extends through an inboard spherical bearing within damper fitting 78, and is attached to another pitch horn 80. The damper fittings 74 and 78 are bolted directed to the rotor yoke 10. The blades (not shown) associated with the rotor yoke 46 are connected thereto in similar fashion.

From the foregoing, it will be understood that the present invention comprises a laminated composite rotor yoke having numerous advantages over the prior art. One significant advantage involves the fact that the rotor yoke of the present invention can be bolted directly to the support mast structure without special clamps or adaptive hardware. The novel structure of the rotor yoke withstands the necessary bearing forces in the area of the attachment bolts. Fatigue strength as well as in-plane shear strength are also improved. Ease of fabrication reduces production costs. Further advantages will readily suggest themselves to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, modifications and rearrangements and/or substitutions of parts or elements as fall within the spirit and scope of the invention.

We claim:

1. A yoke for coupling helicopter blades to a mast, the longitudinal axis of the blades coupled transversely to the longitudinal axis of the mast, comprising:
   a plurality of first layers formed of continuous filaments defining flat loops, each of said first layers having a width in cross section greater than the depth in cross section, and where the width of each layer lies substantially along the longitudinal axis of the blades and the depth of each layer at the mast lies substantially along the longitudinal axis of the mast; and
   a plurality of second layers formed of cross-wise filaments interposed between the layers formed by continuous filaments, each of said second layers having a width in cross section greater than a depth in cross section and where the width of each of the second layers lies substantially along the longitudinal axis of the blades and the depth of each of the second layers at the mast lies substantially along the longitudinal axis of the mast;
   said layers being substantially parallel and defining a flat, elongated loop with side and outboard end portions.

2. The yoke of claim 1, wherein the filaments defining said first layers comprise glass fibers embedded in adhesive.

3. The yoke of claim 1, wherein the filaments defining said first layers comprise glass fiber rovings embedded in adhesive.

4. The yoke of claim 1, wherein the filaments defining said second layers comprise bias ply glass fibers embedded in adhesive.

5. The yoke of claim 1, wherein at least some of said second layers extend between the side portions of the loop to define a central transverse portion, and further including:
   a plurality of filler layers interposed between said second layers in the transverse portion of the yoke.

6. The yoke of claim 1, wherein at least some of the second layers are discontinuous in the side portions to form predetermined gaps to provide flexure areas of reduced cross section in the side portions of the loop.

7. A composite yoke for coupling a pair of helicopter blades to a rotatable support mast, the longitudinal axis of each blade of the pair coupled transversely to the longitudinal axis of the rotatable support mast, comprising:
   a plurality of layers formed of continuous fibers coursing in unidirectional fashion to define flat, elongated loops having spaced apart side sections, each of the layers having a width in cross section greater that the depth in cross section, and where the width of each layer lies substantially along the longitudinal axis of the blades and the depth of each layer at the mast lies substantially along the longitudinal axis of the mast;
   a plurality of layers formed of bias ply fibers and interposed between the continuous fiber layers, each of the layers of bias ply fibers having a width in cross section greater than the depth in cross section, and where the width of each layer lies substantially along the longitudinal axis of the blades and the depth of each layer of bias ply fibers at the mast lies substantially along the longitudinal axis of the mast;
   said bias ply layers interdigitated with the layers of continuous fibers between the side sections of the loop to form a central transverse section; and
   a plurality of filler layers of cross section substantially the same as the cross section of the layers of continuous fibers interposed between said bias ply layers in the transverse section;
   said continuous fiber layers, bias ply layers, and filler layers being substantially parallel in at least the central section of the yoke.

8. The yoke of claim 7, wherein the fibers defining said continuous fiber layers comprise glass fibers embedded in adhesive.

9. The yoke of claim 7, wherein the fibers defining said bias ply layers comprise glass fibers embedded in adhesive.

10. The yoke of claim 7, wherein said filler layers are comprised of bias ply fibers.

11. The yoke of claim 7, wherein the transverse section includes an opening formed therethrough for receiving the mast.

12. The yoke of claim 7, wherein at least some of the bias ply layers are discontinuous in the side portions to form predetermined gaps to provide flexure areas of reduced cross-section in the side sections of the yoke.

* * * * *